Sept. 1, 1959 A. H. BAHNSON, SR 2,902,085
PORTABLE ARM REST FOR MOTOR VEHICLE SEATS
Filed Feb. 4, 1958 3 Sheets-Sheet 1
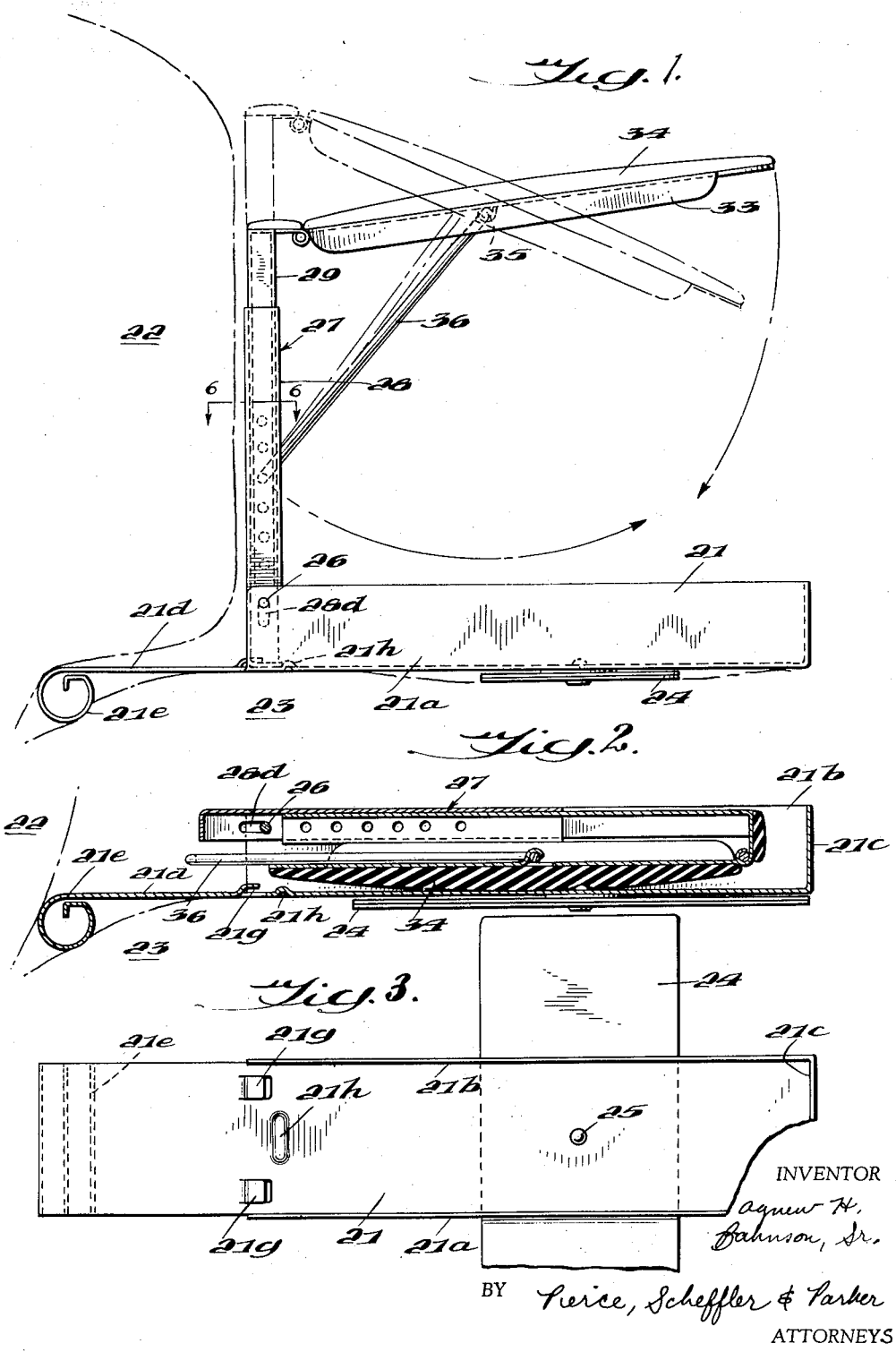
INVENTOR
Agnew H.
Bahnson, Sr.
BY Pierce, Scheffler & Parker
ATTORNEYS

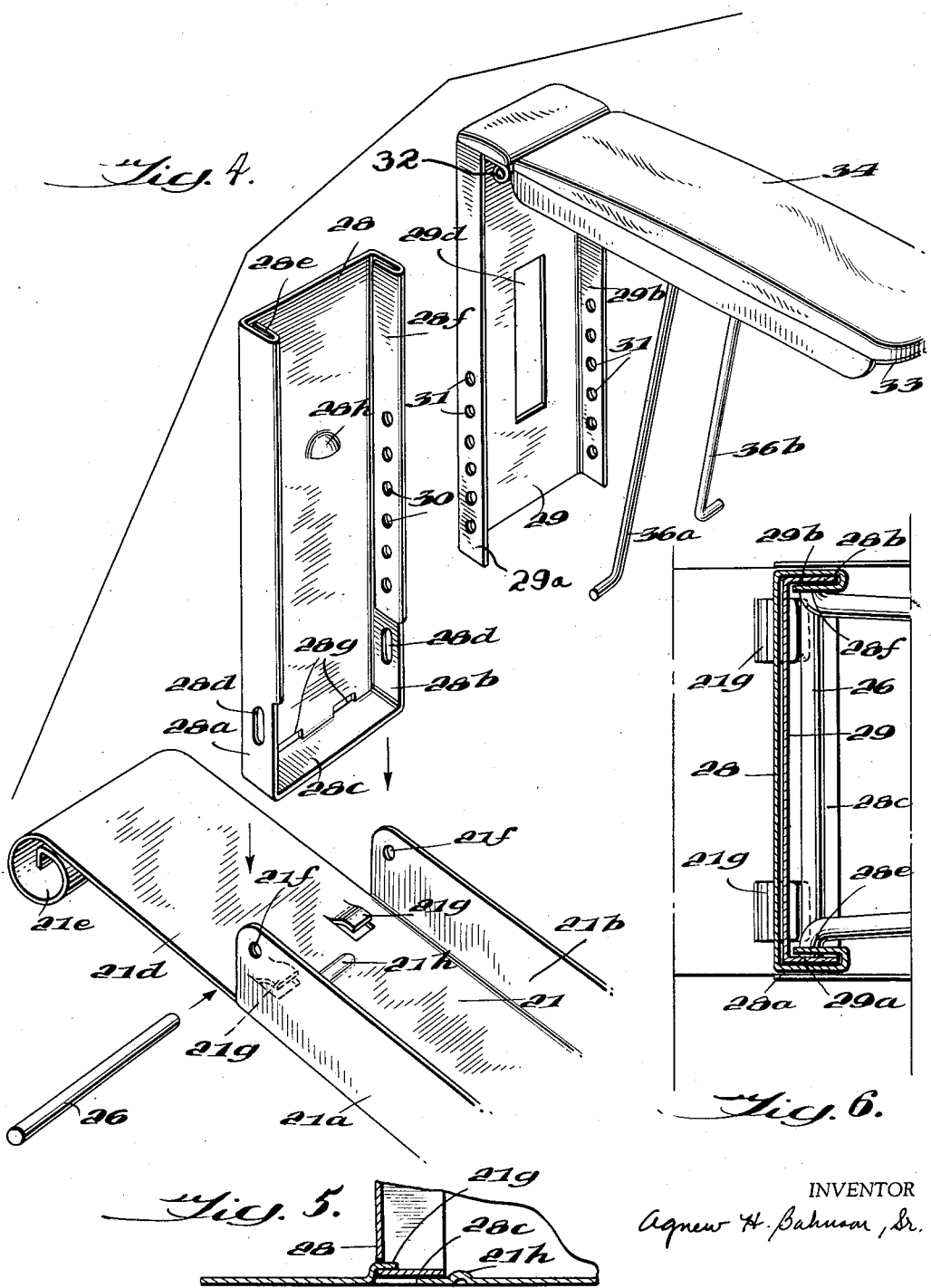

Sept. 1, 1959  A. H. BAHNSON, SR  2,902,085
PORTABLE ARM REST FOR MOTOR VEHICLE SEATS
Filed Feb. 4, 1958  3 Sheets-Sheet 3
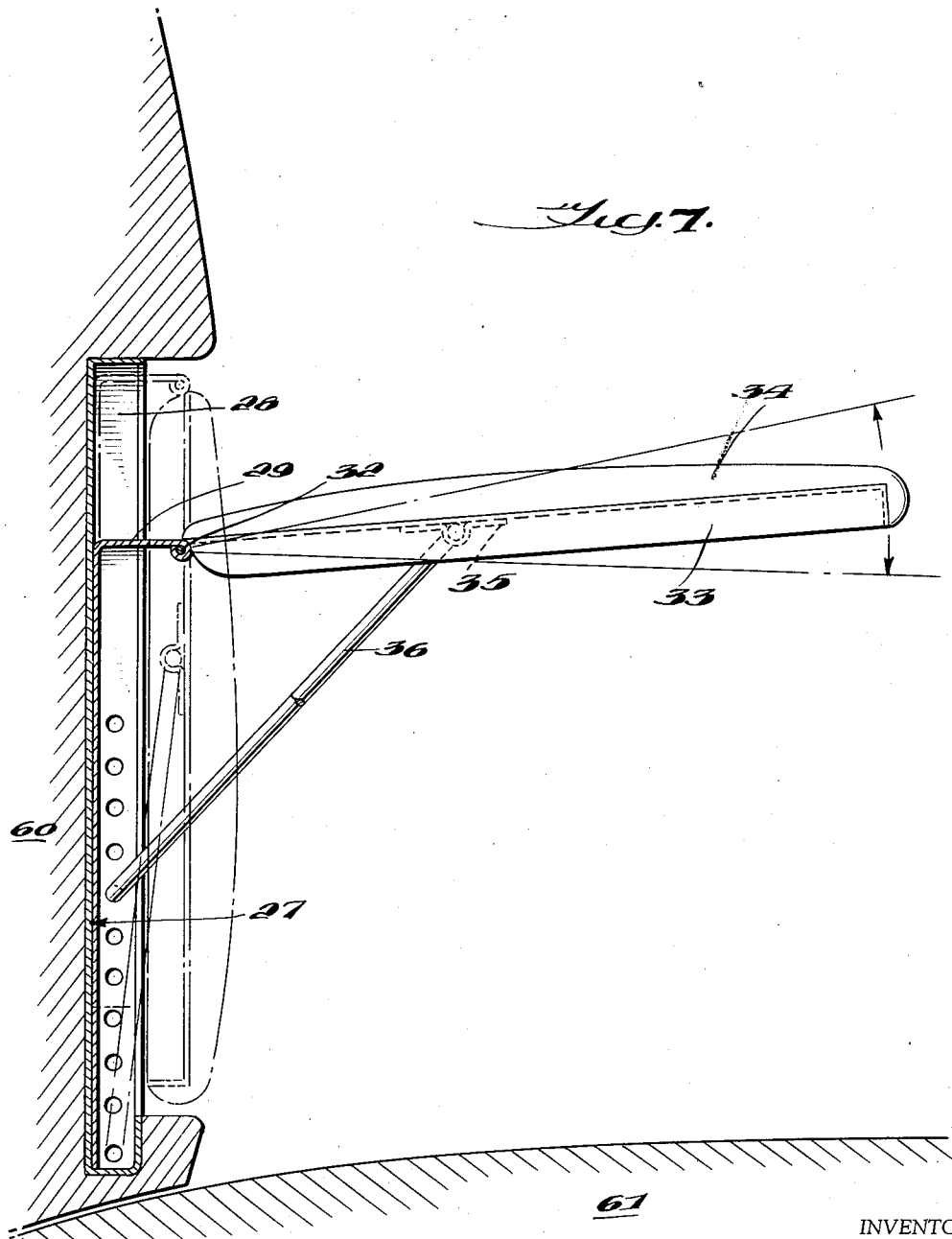
INVENTOR
Agnew H. Bahnson, Jr.
BY Pierce, Scheffler & Parker
ATTORNEYS United States Patent Office 2,902,085
Patented Sept. 1, 1959

2,902,085
PORTABLE ARM REST FOR MOTOR VEHICLE SEATS

Agnew H. Bahnson, Sr., Winston-Salem, N.C.

Application February 4, 1958, Serial No. 713,185

6 Claims. (Cl. 155—198)

This invention relates generally to a portable arm rest for motor vehicle seats, and more particularly to a vertically—and angularly—adjustable arm rest provided with a rear extension projecting intermediate the seat and the seat back and having lateral stabilizing means for firmly balancing the device in actual use.

Portable arm rests for automobiles are well known in the prior art as illustrated by the U.S. patents to Cawthon No. 2,658,560 and Van Briesen No. 2,689,600. The instant invention was developed to provide an improved arm rest of simple, inexpensive construction which is readily adjustable both vertically and angularly to form a rigid, durable structure and which may be easily and quickly collapsed into a small, compact unit for convenient handling and storage.

The primary object of my invention is to provide a vertically and angularly adjustable light-weight portable arm rest for motor vehicle seats which may be readily collapsed to form a compact unit.

Still another object of my invention is to provide an automobile arm rest which may be adjusted both angularly and vertically with only a single connection of the setting means.

A further object of my invention is to provide an arm rest secured at one end in a recess in the seat back of a motor vehicle and being adjustable both angularly and vertically, said arm rest being adapted to be collapsed into said recess to provide a flush outer surface with said seat back.

Another object of my invention is to provide a portable arm rest having base and vertical support members and an arm rest member adjustably connected to said vertical support member, and further including novel means for securing said vertical support member against angular movement with respect to said base member.

Still another object of my invention is to provide a portable arm rest having a base, a vertical support member and an arm rest member angularly adjustable with respect to said vertical support, said vertical support consisting of two telescopically-arranged members for adjusting the height of the arm rest with respect to the associated base member.

A more specific object of my invention is to provide a portable arm rest having a base, a vertical support member and an arm rest member angularly adjustable with respect to said vertical support, said vertical support consisting of two telescopically-arranged members for adjusting the height of the arm rest, and means for simultaneously setting the height of the arm rest and the angular relationship of the arm rest member with respect to the vertical support.

Other objects and advantages of my invention will become more apparent from a study of the following specification and accompanying drawings in which:

Fig. 1 is a side elevational view of the preferred embodiment of my invention with the lateral stabilizer in the extended position;

Fig. 2 is a central sectional elevational view of the portable arm rest of Fig. 1 with the stabilizer in the retracted position;

Fig. 3 is a plan view of the base member of Fig. 1 with the other elements removed therefrom;

Fig. 4 is an exploded perspective view of the rear portion of the arm rest of Fig. 1;

Fig. 5 is a sectional detail view of the means for locking the lower extremity of the vertical support of Figs. 1 and 4 to its associated base member to secure the vertical member in its upright position;

Fig. 6 is a plan sectional view taken along line 6—6 of Fig. 1; and

Fig. 7 is an elevational view of an adaptation of the adjustable arm rest of Fig. 1 formed integrally in the seat back of a motor vehicle.

Referring now to the preferred embodiment of Figs. 1–6, the base member 21 is provided with upstanding side flanges 21a, 21b and a forward upstanding wall 21c connected therebetween to form three sides of an open-topped receptacle. The base member has a horizontal rearward extending portion 21d terminating in a continuously bent curved portion 21e. As shown in Figs. 1 and 2 the horizontal extension 21d and the curved extension 21e are inserted into the space between the seat back 22 and the seat 23 with the main portion of the base member 21 resting on the seat. The lateral stabilizer 24 is pivotally connected to the base member by pivot 25 and when extended to the position of Fig. 3, serves in combination with the extending portion 21d to rigidly balance the unit upon the seat.

Pivotally connected at its lower end to the base member 21 by pivot rod 26 is the vertical support shown generally by the reference numeral 27. As shown in greater detail in Fig. 4 the vertical support 27 consists of two telescopically-arranged parts 28 and 29. Female part 28 has forwardly projecting side flanges 28a, 28b, and a forwardly projecting bottom flange 28c. To connect the vertical support 27 to the base member 21, the lower end of female part 28 is inserted intermediate flanges 21a, 21b and rod 26 is inserted through apertures 21f in the side flanges of the base member and through elongated slots 28d of the side flanges of the female part 28.

As shown in Fig. 4, the side flanges 28a, 28b of female member 28 have portions 28e, 28f folded back upon themselves to form vertical guides for slidably receiving the side flanges 29a, 29b of the telescopically-mounted male member 29. The folded side flange portions 28e and 28f have spaced apertures 30 therein and the side flanges 29a, 29b have spaced apertures 31 therein. Pivotally connected to the upper extremity of the male vertical support member 29 by pivot 32 is the arm rest frame 33 having the cushioned arm rest pad 34 secured thereto. Pivotally connected at its transverse portion to the underside of arm rest frame 33 by plate 35 welded thereto is the U-shaped bracing rod 36 having legs 36a, 36b the extremities of which are urged apart due to the inherent resiliency of the rod. When the male member 29 is telescopically fitted within the female member 28, the extremity of leg 36a may be inserted through an aperture 30 of flange portion 28e and aperture 31 of flange 29a, and similarly the extremity of leg 36b may be inserted through the opposite aperture 30 in flange portion 28f and the opposite aperture 31 in flange 29b. It is important to point out that the connection of the extremities of legs 36a and 36b in the apertures 30 and 31 simultaneously effects two rigid adjustments as illustrated by the solid and phantom lines in Fig. 1: not only may the longitudinal displacement of the male member 29 within the female member 28 be secured as desired, but also the angular relationship of the arm rest frame 33 with respect to the vertical support 27 may be rigidly secured as desired. Thus it is apparent that considerable adjustability of the arm rest for comfort may be obtained as desired with only one setting of the U-shaped bracing rod. The partially punched-out projection 28h in the female member 28 cooperates with the slot 29d in the male member 29 to limit the upward extent of travel of the male member 29.

In order to raise the vertical support 27 from its collapsed position of Fig. 2 to its erect position of Fig. 1 the support 27 is pivoted upwardly about pivot rod 26 and is lifted upwardly with respect to the base member 21 until the rod 26 contacts the lower extremity of slots 28d. The vertical support 27 is then pivoted about rod 26 in a manner to cause the projections 21g partially punched upwardly from the base member 21 to extend forwardly through the slots 28g in the lower extremity of female member 28 as shown in Fig. 5. Dimple 21h contacts the forward edge of flange 28c to assist the resilient flanges 21g in securing the vertical support 27 in its erect position.

When the arm rest is in its erect position shown in Fig. 1 the base member 21 rests upon the seat 23 and the vertical support 27 is contiguous with the seat back 22. The stabilizer 24 provides lateral stability for the unit and the frictional qualities of its under surface prevents sliding of the forward portion of the arm rest on the seat. The upstanding walls 21a, 21b, 21c of the base 21 form with the vertical support 27 a convenient open-topped receptacle for the receipt of various articles commonly used in a motor vehicle, such as tobacco products, sunglasses, beverage containers, maps, writing instruments and the like.

Referring now to Fig. 7, a modification of the embodiment of Figs. 1–6 has been illustrated wherein the arm rest is recessed in the seat back 60 of the seat 61 of a motor vehicle. Using the same reference numerals for like parts in the two embodiments, the female vertical support member 28 is rigidly secured in a recess in the seat back 60. The male vertical support member 29 is slidably telescoped within the female member 28. Arm rest frame 33 is pivotally connected to the male member by pivot 32 and cushioned arm rest pad 34 is secured to the upper surface of the frame 33. Pivotally connected to the under side of the arm rest frame 33 by the plate 35 is the U-shaped bracing rod 36. As in the embodiment of Figs. 1–6 the connection of the extremities of legs 36a, 36b in the apertures 30 and 31 of the flanges 28e, 29f and 29a, 29b, respectively simultaneously achieves two results. First the longitudinal position of male member 29 within the female member 28 is set as desired to position the rear end of the arm rest frame 33 to the desired height above the seat 61, and secondly the angular relationship between the frame 33 and the vertical support 27 may be adjusted as desired. Should it be desired to collapse the arm rest, the legs 36a, 36b are manually urged together to effect disengagement of their extremities from the apertures 30, 31. The frame 33 is then pivoted downwardly about pivot axis 32 and the male member 29 is lifted to its upward extent of travel within female member 28. The frame 33 is then positioned within the seat back recess so that the arm rest pad 34 conforms with the contour of the seat back as shown by the phantom lines.

The embodiment of Fig. 7 is equally suitable for use in either the front or rear seats of the motor vehicle.

While in accordance with the patent statutes I have illustrated and described the best forms and embodiments of my invention now known to me, it will be apparent to those skilled in the art that other modifications and changes may be made in the embodiments described and illustrated without deviating from the invention defined in the following claims.

I claim:

1. An adjustable arm rest comprising a vertical support member consisting of a plurality of vertical sections slidably displaceable longitudinally with respect to each other, a substantially-horizontal arm rest frame pivotally connected at one end to one of said sections for pivotal movement with respect thereto about a horizontal pivot axis, and means for simultaneously locking said sections together at arbitrarily-selected positions of vertical displacement to prevent relative displacement therebetween and for fixedly adjusting the angular relationship between said arm rest frame and said vertical support.

2. An adjustable arm rest as defined in claim 1 wherein each of said sections has parallel flanges thereon providing a telescopic connection between said sections, said flanges having a plurality of spaced apertures therein, and further wherein said means for simultaneously locking said sections together to prevent relative displacement therebetween and for fixedly adjusting the angular relationship between said arm rest frame and said vertical support comprises a bracing rod pivotally connected at one end to said arm rest frame and having a projecting portion at the other end thereof extending through aligned apertures in the flanges of each of said sections.

3. An adjustable arm rest as defined in claim 2 in combination with a seat for human occupants, said seat having a back with a vertical recess therein, the outermost female section of said vertical support being rigidly secured in said vertical recess.

4. An adjustable arm rest as defined in claim 3 wherein said arm rest frame may be pivotally collapsed downwardly into a position parallel with the vertical support to be completely received within the vertical recess in said seat back.

5. An arm rest as defined in claim 1 and further including a normally-horizontal base member pivotally connected to the lower extremity of said vertical support member, and means for rigidly connecting said vertical support member in an erect position with respect to said base member comprising a fixed projection extending from said base member adjacent the pivotal connection of the vertical member thereto, said projection being arranged to extend through a slot in an adjacent portion of said vertical support member when said vertical member is pivoted from a horizontal to a vertical position relative to said base member to lock the vertical member substantially at right angles to said base member.

6. An arm rest as defined in claim 5 wherein the pivotal connection between said vertical support member and said base member comprises a pivot rod connected at its ends to said base member and extending through longitudinally-arranged slots in said vertical support member to permit a slight degree of longitudinal movement of said vertical support member relative to the pivotal axis of the pivotal connection, whereby said arm rest may be folded to a collapsed position by pivoting said arm rest frame downwardly to a position parallel with said vertical support and by subsequently folding said vertical support downwardly to a position parallel with said base member with said arm rest frame intermediate said vertical support member and said base member.

References Cited in the file of this patent

UNITED STATES PATENTS

| | | |
|---|---|---|
| 1,894,621 | Lehman | Jan. 17, 1933 |
| 2,592,702 | Sprung | Apr. 15, 1952 |
| 2,655,331 | Merrit | Oct. 13, 1953 |
| 2,689,600 | Van Briesen | Sept. 21, 1954 |
| 2,697,479 | Fesler | Dec. 21, 1954 |
| 2,766,463 | Bendersky | Oct. 16, 1956 |
| 2,767,950 | Bellon et al. | Oct. 23, 1956 |

FOREIGN PATENTS

| | | |
|---|---|---|
| 28,033 | Great Britain | 1911 |
| 539,019 | Germany | Nov. 21, 1931 |